R. S. SMITH.
PROCESS AND APPARATUS FOR PRODUCING METAL BLANKS.
APPLICATION FILED FEB. 18, 1919.

1,357,356. Patented Nov. 2, 1920.
7 SHEETS—SHEET 1.

Inventor
REUBEN STANLEY SMITH

By Erwin, Wheeler & Woolard
Attorneys.

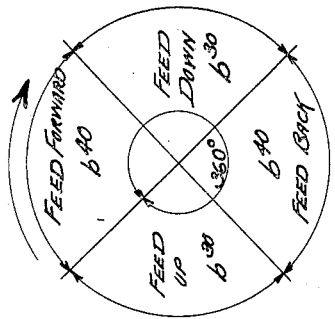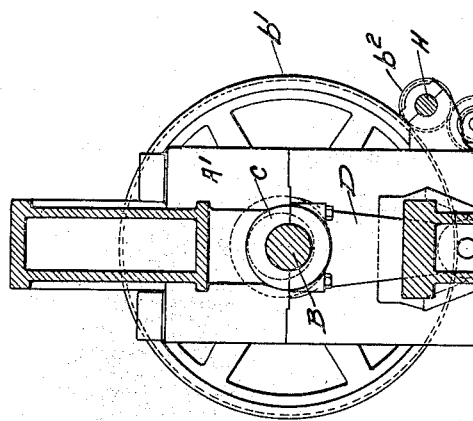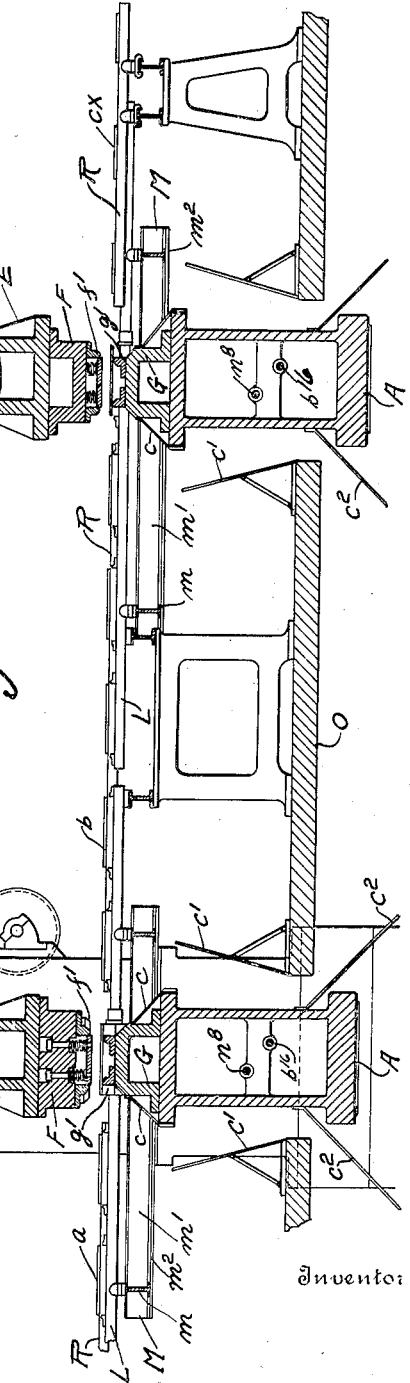

REUBEN STANLEY SMITH

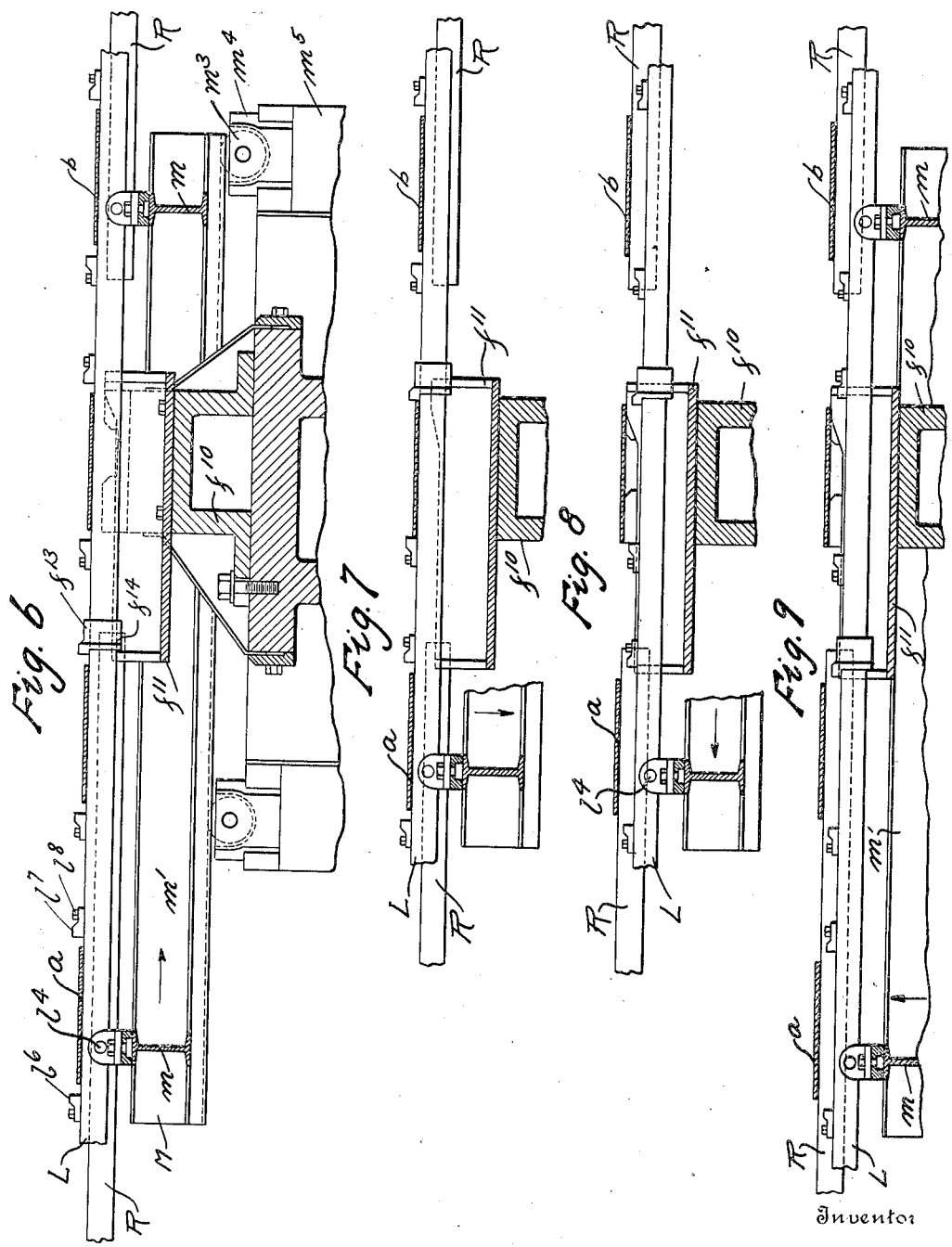
REUBEN STANLEY SMITH

R. S. SMITH.
PROCESS AND APPARATUS FOR PRODUCING METAL BLANKS.
APPLICATION FILED FEB. 18, 1919.

1,357,356.

Patented Nov. 2, 1920.

Inventor
REUBEN STANLEY SMITH

By Erwin, Wheeler & Woolard
Attorneys.

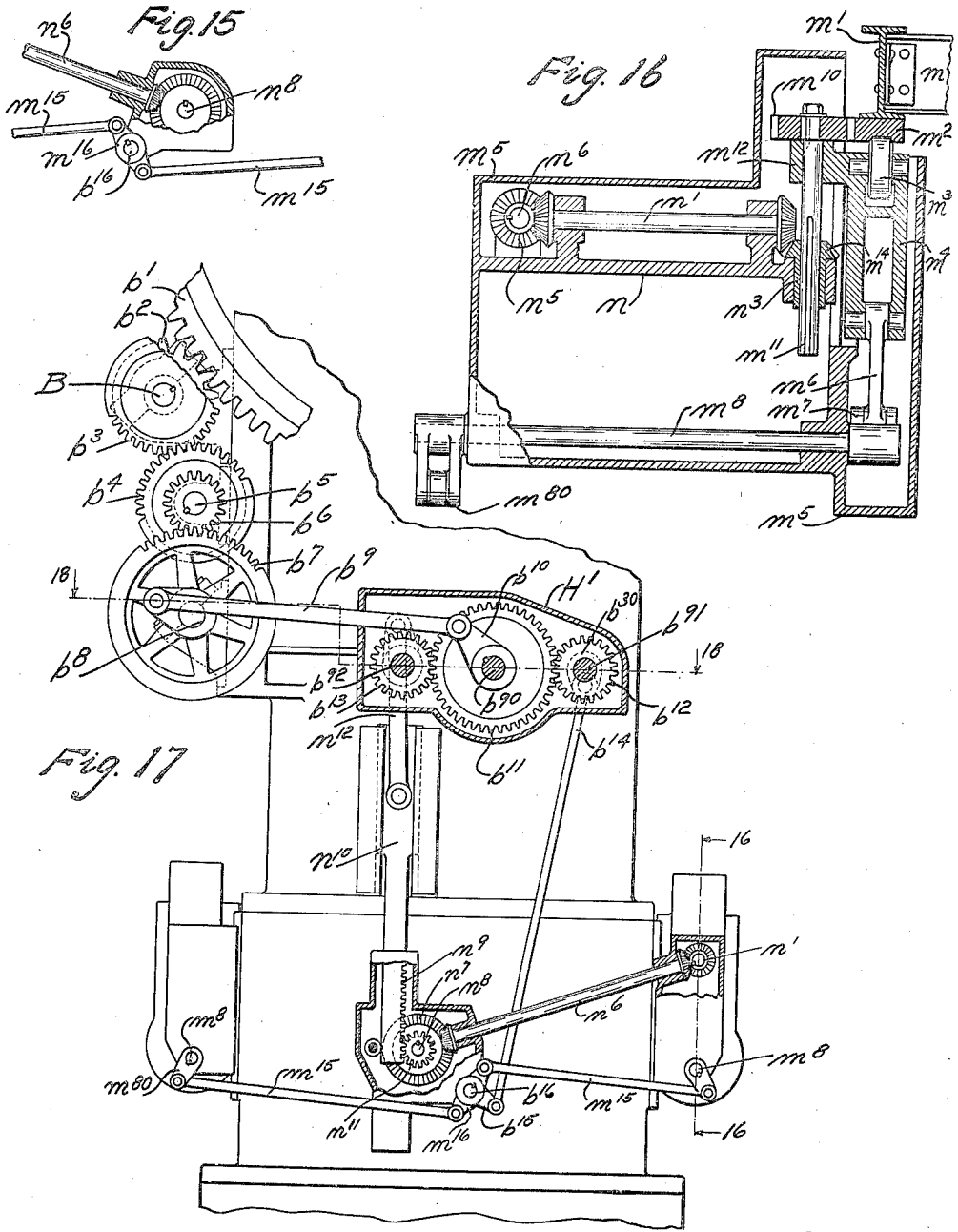

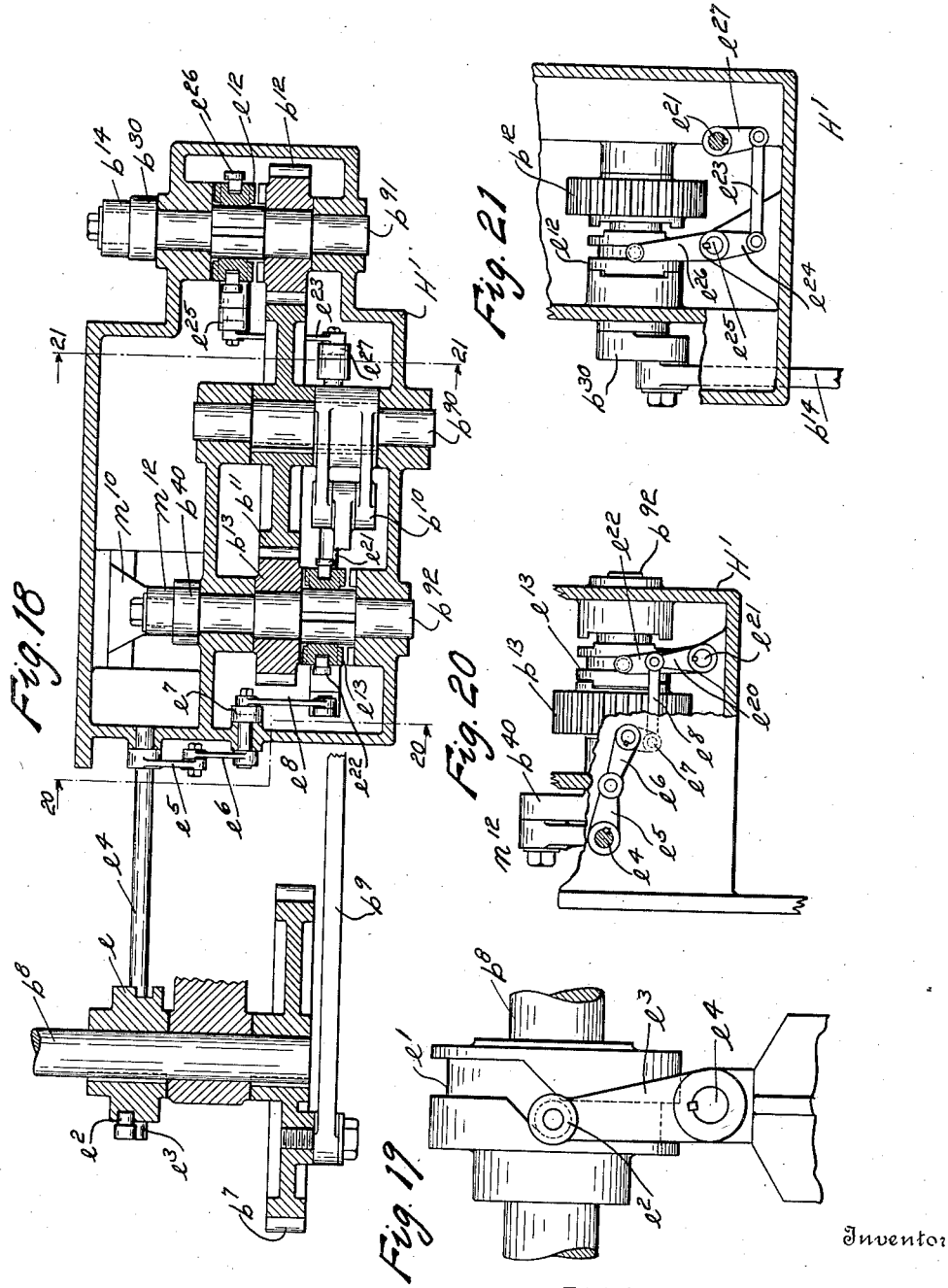

UNITED STATES PATENT OFFICE.

REUBEN STANLEY SMITH, OF MILWAUKEE, WISCONSIN.

PROCESS AND APPARATUS FOR PRODUCING METAL BLANKS.

1,357,356.  Specification of Letters Patent.  Patented Nov. 2, 1920.

Application filed February 18, 1919. Serial No. 277,774.

*To all whom it may concern:*

Be it known that I, REUBEN STANLEY SMITH, a citizen of the United States, and residing in the city of Milwaukee, in the county of Milwaukee and State of Wisconsin, have invented a certain new and useful Improvement in Processes and Apparatus for Producing Metal Blanks, and do hereby declare that the following is a full, clear, and exact description thereof, such as will enable persons skilled in the art to which the invention pertains to make, use, and practice the same, reference being had to the drawings hereto attached for disclosure as to certain details of construction and arrangement as well as the method of operation.

This invention relates to presses for use in the production of contoured metal blanks which subsequently are to be shaped so as to form the side bars of motor vehicle frames, and to the process of forming such blanks.

The machine embodying this my present invention, while designed for general use, is particularly adapted to form an element of the assemblage disclosed in my application Serial No. 212,934, filed Jan. 21, 1918, such assemblage including machines which by their related and successive operations, punch from metal plates or sheets the side and cross bar and other blanks used in constructing an automobile or other vehicle frame, shape such blanks according to the particular requirements pertaining to each, perform the necessary milling operations thereon, assemble the several constituent parts, and secure all of such parts in their respective positions by means of rivets, so that in a continuous operation of mechanical devices a completed automobile or other vehicle frame is automatically produced.

In practice, the assemblage referred to is operated in cycles of time, which are subdivided into alternate periods of work and periods of rest. During the periods in which the work is being performed, the machines of the assemblage operate in substantial synchronism. During the periods of rest, the conveyer mechanisms act to transfer the materials being operated upon from department to department, or from machine to machine at such departments as require more than one machine for the completion of the duties to be performed thereat. The assemblage as an entirety is operated upon a schedule which contemplates the production of completed automobile frames in a definite ratio of a given number of frames per minute.

The present invention is disclosed herein as embodied in side bar blanking presses located at the side bar blanking department, one at each side of the assemblage, and resides in a machine embodying a plurality of blanking presses, each of which in its turn operates upon a sheet metal plate or strip fed thereto, and by successive operations thereon so cuts away the margin of the material in the plate or strip that a blank having a finished outline or contour, and from which a side bar for a motor vehicle may be shaped or formed, is produced. It has heretofore been common to produce a blank of this character by a single operation of the press, but such production was attended with certain difficulties and delays, as hereinafter recited, and which are avoided by the use of my invention. In the operation of my invention, plates or strips of sheet metal of the required gage are fed into the machine, each of such plates or strips being as closely related as possible in its superficial area to the dimensions of the blank to be produced therefrom.

It has not heretofore been fully realized that the problems involved in making large blanks, such as vehicle frame elements, are quite different from those involved in blanking small articles regardless of any question of shape or contour. For example, in cutting large blanks, such as those designed to be formed into side bars of vehicle frames, the material cut away constitutes a loose flexible skeleton of large proportions, the removal of which from the press requires the combined effort of two or more men, and when removed these long rectangular strips must be cut up in a separate machine to produce scrap which can be conveniently handled and used or remelted.

As heretofore constructed, the ordinary blanking press has been adapted to cut blanks of the contours required for side bars, and cross bars of vehicle frames in a single operation, but these presses are not adapted for use in the assemblage above referred to on account of certain difficulties and delays, such, for example, as the necessity of removing the large irregular portions cut from the margins of the blank and which required to be manually lifted and manipulated to remove them from between the parts of the press to be subsequently cut into pieces, as scrap metal. This difficulty, among others, not only made former blanking operations slow and expensive, but prevents satisfactory use of such a press in the assemblage above referred to by making it impossible to either accurately determine the required time interval between successive blanking operations, or make it short enough to correspond in duration with the limited number of seconds, which constitute the working interval within which the other tools and machines in the assemblage perform their respective operations.

I have discovered that by subdividing the blanking operation, instead of attempting to perform it in a single stroke of one press, I can not only expedite the operation in its entirety, but can do away with subsequent scrap cutting. I have further discovered that the material can be quickly and even automatically fed from one press to another in the intervals between the subdivided operations, thus clearing the first press for the next blank. Successive operations may thus be performed on the same blank, and simultaneous operations performed on a succession of blanks, all within the short and definite time intervals which constitute the working intervals of the assemblage.

The invention comprises a novel combination in one machine of a series of blanking presses, the first of which by one operation is adapted to cut away portions of the metal plate lying beyond the predetermined outlines of the side bar blank to be produced, and the second of which by a succeeding operation is adapted to cut away the outlying portions remaining after the operation of the first press, and thus complete the side bar blank. By thus dividing the usual blanking operation into a series of operations which are performed in succession, I am enabled to operate my blanking press continuously and without the delays heretofore attendant upon the operation of similar presses.

The invention also comprises novel devices for feeding the metal plates from press to press and through the machine, and also in devices for positioning the metal plates for the operation of the blanking presses, such positioning devices acting in conjunction with the feeding devices.

I have also devised means for actuating the feeding devices, whereby an accurate feeding of the metal plates to the assemblage of blanking presses is attained.

The invention further resides in the provision of devices for clearing the presses of "scrap," and for depositing the scrap at a point remote from the machine. By automatically clearing the presses of scrap, I am enabled to operate my improved machine continuously, and thus avoid delays heretofore incident to such operation.

In the operation of blanking presses known heretofore, the scrap consists of the skeleton remaining in the metal plate or sheet after the blank has been punched therefrom. This skeleton frequently adheres tightly to the dies of the press after punching, and can be removed therefrom only by the costly expenditure of both time and labor. The time required to remove from the press the sheet of scrap material which has adhered to the punching dies, in most instances exceeds the time required to feed a plate to the press and perform the blanking operation.

Present methods of treating the scrap thus created involve a considerable outlay in industrial plants of any magnitude, inasmuch as the long sheets or strips of scrap coming from the larger blanking presses must be drawn out by hand and reduced by clipping into short lengths to meet commercial requirements, and for convenience in handling and storing. Doing these things manually, constitute items of considerable expense, which it is the purpose of my invention to completely eliminate, by reason of the provision of automatic devices for effecting the results desired.

As an incident to the formation of a side bar blank in the manner above described, scrap consisting of the small marginal portions of the plate which have been cut away in the operation of the blanking presses, is produced. This scrap is now reduced to commercial sizes, and does not require any further treatment or handling, the scrap being disposed of automatically, as stated.

An important feature of the invention resides in the construction and arrangement of the punching dies, the latter being in short sections, so that they may be readily fitted or adjusted in the press and properly spaced apart according to the contour of the blank to be produced. This feature enables me to use standard sections of dies, both on the straight as well as the curved lines of the blank, and limits the necessity for the manufacture of new and special dies to such lines of the blank as can not be cared for by the dies already in stock. A further advantage flowing from the use of sectional dies pertains to their manufacture. By making the dies in short sections, the difficulty heretofore encountered, namely, the warping of the die in hardening a lengthy section, entirely disappears, and the loss incurred through the breaking of a lengthy die section is materially reduced. The dies employed in the first operation in removing the alternate sections of the margin of the plate beyond the outline of the blank are flared slightly at their open sides, so that the scrap will readily fall away, and not choke the dies.

The invention also comprises a process of forming blanks from sheet metal plates which consists in cutting the plate at separated points on the contour line of the blank by the operation of one set of dies, moving the plate, and cutting it on the contour line intermediate to said points by a second set of dies, to complete the formation of the blank. At the same time, in the practice of the process, the skeleton of the sheet from which the contoured blank of irregular outline is cut, is reduced to scrap of commercial sizes.

The construction and operation of my invention will now be described in detail, to be followed by the claims which are directed to the novel features of the invention, an embodiment of which is represented in such construction.

My invention will be more clearly understood by reference to the accompanying drawings, in which:

Fig. 3 is a longitudinal sectional view through the machine, a part of the second blanking press being broken away.

Figure 5:
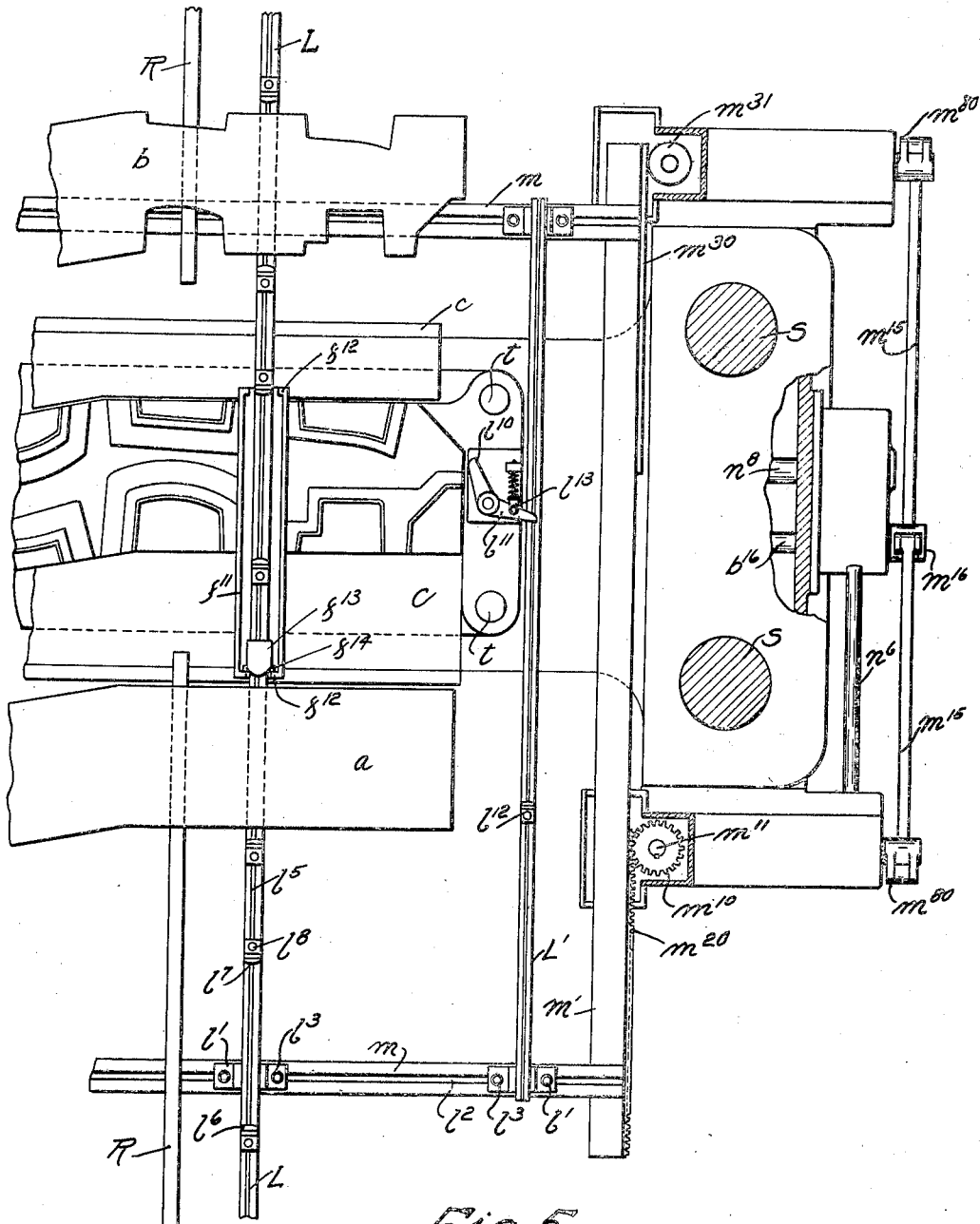
Figure 10:
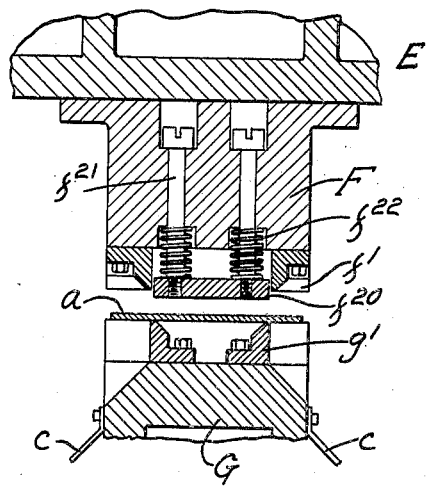
Figure 11:
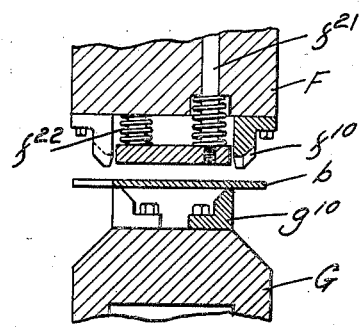
Figure 12:
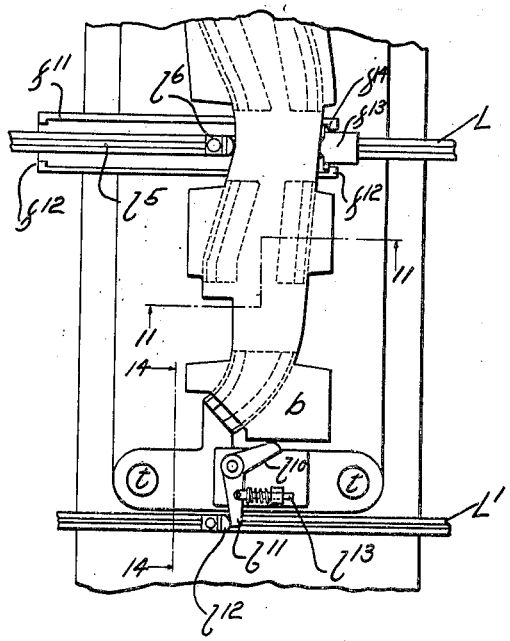
Figure 13:
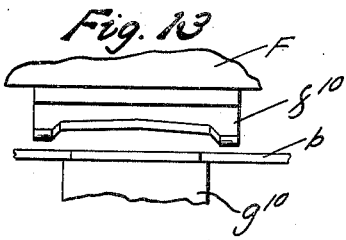
Figure 14:
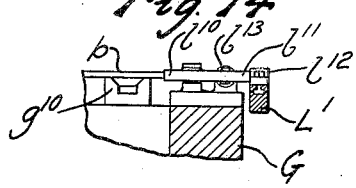

Fig. 4 is a view which shows the cycle of movements of the strip feeding frames through their rectilinear path, to feed the strips into the machine, and from the first to the second blanking press, Fig. 5 is a section in plan of a part of one of the strip feeding frames, in the plane of the lower cutter head, and Figs. 6 to 9 are diagrammatic views in longitudinal vertical section showing the succession of movements of one of the strip feeding frames through its rectilinear path, the parts being in the positions occupied by them at the commencement of such movements, Fig. 10 is a vertical sectional view, enlarged, of the cutters of the first of the blanking presses of the machine, and Fig. 11 is a like view of the cutters of the second press, the latter view being taken on the line 11—11, Fig. 12, Fig. 12 shows in outline and in plan one end of a blank in position for completion by the operation of the second press, and showing also one of the feeler devices for positioning the blank in the press, Fig. 13 shows in elevation one of the pairs of cutters of the second press, the view being taken from the right of Fig. 11, Fig. 14 is a view on the line 14—14, Fig. 12, showing the blank positioning feeler device in elevation.

Fig. 15 shows in detail certain parts relating to the actuation of the strip feeding frames, the said parts appearing in the position occupied by them in the end of the machine shown in Fig. 5.

Fig. 16 shows in vertical section the construction and arrangement of the devices for actuating the strip feeding frames through their rectilinear paths.

Fig. 17 is a partial view, looking from the other side of Fig. 3 showing the connections from the driving power shaft of the machine, to the strip feeding frames.

Fig. 18 is a sectional view on the line 18—18, Fig. 17, showing the driving clutches and their operating connections.

Fig. 19 is a detail view showing the cam for actuating the clutches shown in Fig. 18.

Figs. 20 and 21 are sectional views on the lines 20—20 and 21—21, respectively, Fig. 18, showing the movements of the clutches into and out of their effective positions.

In the drawings, the base A supports the frame $A^1$ of the blanking press, such frame being constructed as is usual in machines of this class. The shaft B, journaled in the frame $A^1$ carries eccentrics C, which through connecting links D, actuate the cross-head E carrying the vertically reciprocating cutter head F, to which the upper set of cutters $f^1$ is attached. The cutter head G carrying the lower set of cutters $g^1$, is mounted in the frame $A^1$ at a fixed point in position for the coöperation of the cutters carried by the two heads. The shaft B is actuated through gears $b^1$, meshing with gears $b^2$, secured to the driving shaft H, to which the power is applied.

Figure 1:
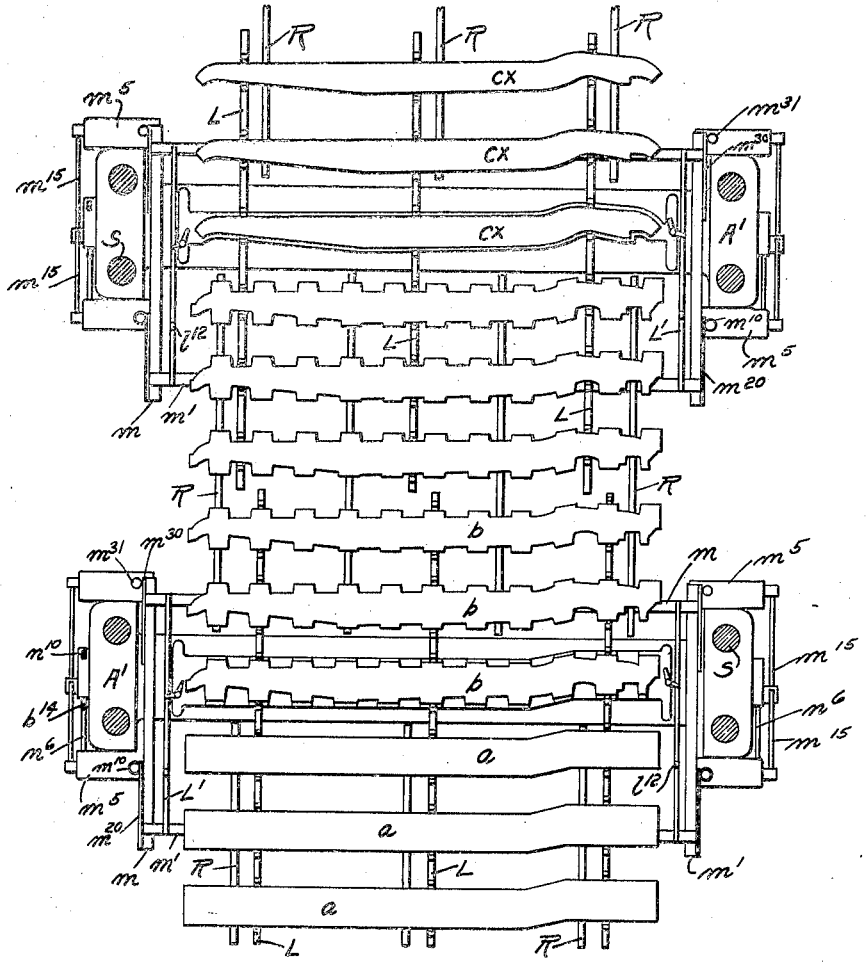
Figure 1 is a horizontal view in plan through a blanking press in the plane in which the strips to form the side bar blanks are fed through the machine.

In Figs. 1 and 5, S, S, are the straining rods for holding the parts of the press together, and in Figs. 5 and 12, $t$ indicates openings in the lower cutter head for the reception of guiding or doweling pins carried by the upper cutter head, so as to secure registration of the cutters in the blanking operation. The first blanking press being duplicated in the construction of the second blanking press, description of the latter press is rendered unnecessary.

Mounted in the frame of each press so as to have movements through a rectilinear path, is a feeding frame M, constructed conveniently of flanged beams, the purpose of which frames is to feed and carry the strips from which the blanks are formed into and through the machine. The side bars $m$ and the end bars $m^1$ of the frames M are secured together at their meeting angles. Attached to the underside of each end bar $m^1$, is a grooved strip $m^2$, in the groove of which is received guiding and supporting rollers $m^3$, mounted at the upper end of slide $m^4$, which have vertical movements in the housing $m^5$, attached to the frame of the press. Such vertical motion is imparted through links $m^6$, connecting the said slides with arms $m^7$, fixed to the rock shafts $m^8$, mounted in the housing $m^5$. By rocking the shafts $m^8$, vertical motion is imparted to the frames M, through the connections described.

Upon the outer forward edge of each grooved strip $m^2$, is a toothed rack $m^{20}$, with which engages a pinion $m^{10}$, keyed to the upper end of a short shaft $m^{11}$, which shaft is supported vertically in a bearing $m^{12}$, projecting from the slide $m^4$. A shaft $n^1$ is journaled in bearings on a support $n$, in the housing $m^5$. The support $n$ is bored to receive the hub $n^3$ of a bevel gear $m^{14}$, through which passes with free vertical movement, the short shaft $m^{11}$. A spline connects the bevel gear and the shaft, so that rotary movement of the former is imparted to the latter. The bevel gear $m^{14}$ engages a like gear on the end of shaft $n^1$. On the other end of shaft $n^1$, is a bevel gear engaging a like gear $n^5$ on a shaft $n^6$, to which latter is imparted a rotary reciprocating movement, which through the connections described is converted into longitudinal motion of the frame M.

The outer rear edge of each grooved strip $m^2$, has a plane surface $m^{30}$, against which bears an idle guiding roller $m^{31}$, to insure accurate horizontal movement of the frame M.

In the two preceding paragraphs, I have described the arrangement and construction of the mechanisms whereby vertical and longitudinal motions are imparted to the frames M, which motions when combined in the succession indicated in the diagram, Fig. 4, will complete the cycle through which the frames M are moved through their rectilinear paths in feeding the strips to and through the blanking presses and carrying the completed blanks away therefrom. The mechanisms referred to above are employed to impart the movements ascribed to the frames M, and are actuated as will now be described. The driving shaft B has keyed thereon a gear $b^3$, which meshes with a gear $b^4$, with which rotates gear $b^6$, both keyed to shaft $b^5$. On the shaft $b^8$ is mounted the gear $b^7$, engaged by and driven from the gear $b^6$. One of the arms of the gear $b^7$ is provided with a crank pin, to which is connected one end of a link $b^9$, and the other end of which link is connected to a radial arm $b^{10}$, fixed to shaft $b^{90}$. The rotation of the gear wheel $b^7$, through the crank pin and link is transmitted to the radial arm $b^{10}$, which arm is thereby oscillated once through an arc of 90° for each rotation of the wheel $b^7$. Keyed to or otherwise mounted upon the shaft $b^{90}$, with the said radial arm, is a gear $b^{11}$, and engaging this gear are two crank gears $b^{12}$ and $b^{13}$, mounted to rotate freely upon the short shafts $b^{91}$ and $b^{92}$, which shafts carry cranks $b^{30}$ and $b^{40}$. A housing $H^1$, attached to the frame of the machine, incloses the gears $b^{11}$, $b^{12}$ and $b^{13}$, and their shafts and connections.

The crank $b^{30}$ of gear $b^{12}$ is connected by link $b^{14}$ to an arm $b^{15}$, attached to a rock shaft $b^{16}$, extending through the press, and having fastened at each end a double armed lever $m^{16}$, see Figs. 15 and 17. Links $m^{15}$ connect the several arms $m^{16}$, with arms $m^{80}$ of the rock shafts $m^8$. The crank $b^{30}$ of gear $b^{12}$ is actuated through an arc of 180° with each oscillation of the gear $b^{11}$, and thus vertical movements are imparted to the frames M.

The crank $b^{40}$ of pinion $b^{13}$ is connected by a link $n^{12}$ to a slide $n^{10}$ guided in the frame of the press. This slide is provided at its lower end with a toothed rack $n^9$ which is held in engagement with a pinion $n^{11}$, keyed to a shaft $n^8$ extending across the press, parallel to the shaft $b^{16}$. The shaft $n^8$ carries bevel gears $n^7$ engaging pinions upon the inner ends of shafts $n^6$. At their outer ends, these shafts carry bevel pinions $n^5$, which engage pinions upon the contiguous ends of shafts $n^1$. See Figs. 15 and 16. As in the case of the crank $b^{30}$ of pinion $b^{12}$, the crank $b^{40}$ of pinion $b^{13}$ is actuated through an arc of 180° with each oscillation of the gear $b^{11}$, and thus horizontal movements are imparted to the frames M.

The cranks $b^{30}$ and $b^{40}$ of gears, $b^{12}$ and $b^{13}$, Fig. 17, for imparting vertical and reciprocating movements to the frame M, each make their single movements in alternation with the other, as indicated in the cycle of movements of the frame M, Fig. 4. While one crank is making its half rotation in one direction, the other crank is at rest. Then while the second crank is making its half rotation in one direction, the first crank is at rest. These operations are now repeated, each crank in its turn making its half rotation in the reverse direction.

These intermitting and alternating movements of the cranks $b^{30}$ and $b^{40}$, of gears $b^{12}$ and $b^{13}$, are produced by a train of devices which will now be described. Keyed to the shaft $b^8$ is a cam $e^1$, in the peripheral groove of which travels a roller $e^2$, carried at the free end of a radial arm $e^3$, fixed upon a rock shaft $e^4$, the said rock shaft being suitably journaled in the frame of the machine. Rotation of the cam gives one complete oscillation to the rock shaft $e^4$, Figs. 18 and 19. At its end remote from the cam $e$, the rock shaft is provided with a fixed arm $e^5$ having a pin and slot connection with the pivoted arm $e^6$. A short arm $e^7$ is attached to the first of the arm $e^6$, and is connected by a link $e^8$ to the arm $e^{20}$ of a rock shaft $e^{21}$, journaled in the housing $H^1$.

Splined upon the short shafts $b^{91}$ and $b^{92}$, respectively, mounted in the housing $H^1$, are clutch hubs $e^{12}$ and $e^{13}$. These clutch hubs are formed with double clutch faces, and one face of each gear $b^{12}$, $b^{13}$, is formed to engage with one of the clutch hub faces. Bosses on the housing are formed with clutch faces to engage the other faces of the clutch hubs.

The rock shaft $e^{21}$ carries a yoke $e^{22}$ which engages the clutch hub $e^{13}$, and by its oscillation moves the clutch hub into operative engagement with the gear $b^{13}$, or into engagement with the boss on the housing. At its other end the rock shaft $e^{21}$ carries an arc $e^{27}$, connected by link $e^{23}$ to an arm $e^{24}$, fixed to a short rock shaft $e^{25}$, which latter carries a yoke $e^{26}$. The yoke $e^{26}$ engages the clutch hub $e^{12}$, and the latter is moved with the gear $b^{12}$ and boss on the housing as above described with reference to the clutch hub $e^{13}$. By reason of being free upon the shafts $b^{91}$ and $b^{92}$, the gears $b^{12}$ and $b^{13}$ oscillate continuously, due to their engagement with the gear $b^{11}$.

It will therefore be seen that the rotation of the rock shaft $e^4$ in one direction will serve to engage the clutch hub $e^{13}$ and gear $b^{13}$, so as to give the crank $b^{40}$ one throw; and at the same time the clutch hub $e^{12}$ will remain in engagement with the boss adjacent thereto and hold the crank $b^{30}$ against movement. A reverse rotation of the rock shaft $e^4$ will engage the clutch hub $e^{12}$ and gear $e^{13}$, so as to give the crank $b^{30}$ one throw; and at the same time the clutch hub $e^{13}$ will be disengaged from the gear $b^{13}$ and passed into engagement with boss adjacent thereto and thus hold the crank $b^{40}$ against movement.

Extending in the direction of its longitudinal movement, the frame M is provided with a series of parallel bars for supporting and clamping the strips from which the blanks are to be formed, so that such strips may be accurately positioned with relation to the cutters carried by the cutter heads F and G, and employed to produce completed blanks having the desired configuration. I have illustrated in Fig. 1, three of such supporting and clamping bars upon the frame M, and indicated L, as sufficient in the present instance, to support and position the strips from which the side bars of an automobile frame are banked.

These bars L are held in position upon the side bars M of the frame by means of angular braces $l^1$. The bars L have provision for quick lateral adjustment lengthwise of the side bars $m$, so that such bars may readily be positioned in accordance with the longitudinal dimensions of the particular plates to be blanked. To effect this adjustment, I have attached a slotted plate $l^2$, to the top of the side bars $m$, and have placed therein the heads of clamping bolts $l^3$. The threaded nut of the bolt bears upon the foot of the brace $l^1$. A pin $l^4$, passes through the upstanding ears of a pair of the braces $l^1$, and secures the bar in its longitudinal position on the frame M, a second pair of angular braces being arranged at the other end of the bar L, for the same purpose.

The bars L are slotted longitudinally in their upper surface at $l^5$. See Figs. 5, 12 and 14. Guided in the slots, and clamped to the bars L by means of bolts $l^8$, are lugs $l^6$ and $l^7$, which engage and position the plates, indicated $a$ in Figs. 1, 3, and 5 to 9, as such plates are fed into the presses by the frame M, preparatory to the blanking operation. These lugs are positioned and clamped upon the bars L, at identical distances apart, so that the plate $a$ advanced by the first set of lugs $l^6$, through the first forward longitudinal movement of the frame M, will be in the exact position necessary to enable it to be picked up and again advanced by the second set of lugs $l^6$, upon the second forward longitudinal movement of the frame M. This step-by-step advance in endless procession of the plates $a$ from their initial entry into the machine, will continue synchronously until the blanking operations have been completed. The blanks will then be discharged from the machine in the same orderly and continuous manner.

The plates $a$ may be placed in succession upon the feeding frame M in any manner or by any means which it may be desired to employ. It is my purpose, however, to perform such placing by mechanical means. After the first blank is placed in position of the frame M and engaged by the first set of lugs $l^6$ on the bars L, the frame M is given its first forward feeding movement into the machine by the rotation in one direction of the crank $b^{40}$ of gear $b^{13}$, through the connections hereinbefore described. At the end of this forward motion the frame M is withdrawn from the plane of the said movement, and into a position in a lower plane, so that the plate $a$ is freed from engagement by the lugs $l^6$, and remains undisturbed in the position to which it has been advanced by such forward movement. The plate now rests in the plane of the cutters carried by the heads F and G. This movement of withdrawal of the frame M is effected by the rotation in one direction of the crank $b^{30}$ of gear $b^{12}$, through the connections hereinbefore described. The rotation in the reverse direction of the crank $b^{40}$ of gear $b^{13}$, moves the frame M longitudinally through its lower plane to the front of the machine, and the rotation in the reverse direction of the crank $b^{30}$ of gear $b^{12}$, moves the frame M vertically to its initial feeding position. The cycle of movements of the frame M has been completed, and is now continued while the machine is operating.

To maintain the plates $a$ in the positions to which they have been advanced by the successive forward movements of the frame M, I provide a series of rests or supports R, which are carried from the floor in the manner indicated in Fig. 3. The rests R are arranged both in front and rear of each blanking press, so as to form a track-way, broken at the blanking presses, with its supporting surface in the plane of the space between the cutters $f^1$, $g^1$, when the latter are separated for the reception of a plate $a$. After being transferred by the downward movement of the frame M and deposited on the rests or supports R, the plates $a$ are advanced thereon, in regular succession by the repeated movements of the frame M.

Figure 2:
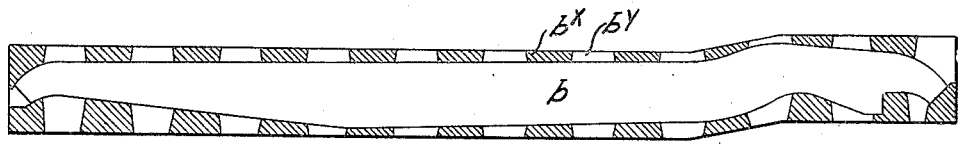
Fig. 2 is a plan view showing one of the partly finished side bar blanks, but showing the outline of a completed blank.

It will be recalled from what has been stated heretofore, that the first blanking press cuts away only that part of the material of the plate lying beyond the outline of the blank, and that the second blanking press completes the operation by cutting from the plate all of the remaining material which is beyond the said outline. After the operation of the first blanking press the plate, indicated $b$ in Fig. 2, is left with sections of projecting uncut portions $b^y$, alternate with open spaces $b^x$, from which the material has been cut. The second blanking press completes the operation by cutting from the plate $b$ the projecting portions $b^y$, and thus the finished blank $c^x$ is produced.

The first and second blanking presses have their cutters arranged so as to produce the alternate cuttings of the plate in the manner described, such cutters being in alternating parallel planes extending from one press to the other. This arrangement of the cutters in alternating parallel planes enables me to utilize certain of the spaces between the lower cutters in each press as a passage for the bars L of the frame M.

In the spaces referred to and supported by the base A of the machine, are secured the blocks $f^{10}$, to which are bolted guiding channel boxes $f^{11}$. These boxes have their sides inturned at their ends, as at $f^{12}$ so as to form a constricted passage and guide for the bars L and lugs $l^6$, $l^7$. The lugs $l^7$ are omitted from the bars L at the line where the plate $a$ is fed to the press for the blanking operation, and in substitution for the omitted lug, I have provided a collar $f^{13}$ having a sliding connection with the bar L. These collars constitute a movable clamp and coöperate with their related lugs $l^6$ on the bars L, to accurately position the plate with relation to the cutters. The said sliding collar is provided with ears $f^{14}$ which engage the inturned ends of the sides of the box $f^{11}$, upon each longitudinal movement of the bar L, and thus limit the traverse of the collar to the length of the channel box. In the movement to feed a plate $a$ between the cutters, the collars $f^{13}$ will be arrested by contact of the ears $f^{14}$ thereon with the inturned ends $f^{12}$ at the rear end of the boxes $f^{11}$, the said ends serving as a stop to the further inward movement of the collars. The plate $a$ resting upon the bars L will be carried forward until its advancing edge contacts with and its further movement is stopped by the collars $f^{13}$. By this time the frame M has completed its forward movement, and the lugs $l^6$ are in close engagement with the other edge of the plate $a$, whereby the latter is brought to a position of rest with relation to the cutters and for the blanking operation of the latter. Upon the reverse longitudinal movement of the frame M, the collars $f^{13}$ will engage the inturned ends $f^{12}$, at the front end of the boxes $f^{11}$, and thus restore the said collars to their initial position on the bars L, to receive another plate $a$.

When the plate $a$ reaches its position in the first blanking press, having been alined laterally by the lugs $l^6$ and collars $f^{13}$ on the bars L it is desirable to ascertain whether the plate occupies its correct position longitudinally, and if found to be out of such last mentioned position, to make correction of the position of the plate before the blanking operation takes place. To bring about this result, I have pivoted at each end of the press, near the path of movement of the plate $a$ into position for blanking, certain feeler devices, which by contacting with the projecting ends of the plate $a$, will serve to correct any longitudinal displacement thereof, immediately prior to the commencement of the blanking operation. Figs. 5 and 12. This feeler device consists of a pivoted elbow lever, one arm $l^{10}$, of which lies adjacent the advancing path of plate $a$, and the other arm $l^{11}$ of which is in the path of movement of a lug $l^{12}$, carried by the frame M, and by which the elbow lever is actuated at the termination of the movement of the frame M in feeding the plate $a$ into blanking position in the press. The lug $l^{12}$ is mounted upon and carried by a bar $L^1$, all of like construction and in like manner with reference to the lugs $l^6$ and bars L. A spring actuated plunger $l^{13}$, connected at one end to the arm $l^{11}$, and resisted at the other by a guiding ear on the frame, serves to restore the feeder to its normal inoperative position after each actuation by the lug $l^{12}$. The movement of the frame M to a position in the lower plane, withdraws the lug $l^{12}$ from engagement with the feeler, and the action of the spring actuated plunger $l^{13}$, removes the feeler from the path of movement of the cutters $f^1$.

The lower cutter head G, of the first press is provided with cutters $g^1$, which are designed and arranged upon the head in accordance with the outline of the blank which the machine is to produce. Likewise, the cutters $f^1$, are correspondingly and cooperatingly arranged upon the upper cutter head F. In the blanking operation of the first press, the cutters $f^1$ remove the material from the plate $a$ at the points indicated $b$, in Fig. 2.

The cutter head F carries a clamping plate $f^{20}$, which is arranged in the open space intermediate the lines of the cutters $f^1$. This clamping plate is secured to the cutter head by means of screws $f^{21}$, and is pressed forward to a position slightly in advance of the cutters by expansion springs $f^{22}$, so as to bear upon and hold the plate $a$ firmly in position at the time the cutters are in action. The said plate $f^{20}$, also acts through its springs to clear the blank from the open space between the cutters $f^1$.

The cutters $f^{10}$ and $g^{10}$ of the second press are designed and arranged in their respective cutter heads, so as to shear from the plate the projecting portions indicated $b^y$, in Fig. 2, thus completing the blanking operation. Upon referring to Fig. 13, it will be observed that the cutters $f^{10}$, are so shaped that a shearing action upon the projections $b^y$ is obtained.

As is recited in the statement of invention at the commencement of this specification, the primary purposes of this invention reside in the organization designed for the production of blanks for making side bars for automobiles. It is recited also that incidental to the attainment of the primary purposes of the invention, there exist certain secondary purposes, whereby the organization is enabled to dispose automatically of the "scrap," the presence of which heretofore has impeded to a material degree the successful operation of known blanking presses designed for the present class of work. The objection referred to resides in the difficulties encountered in clearing from such known machines the scrap remaining therein after the blanking operation has been completed.

As hereinbefore indicated, the scrap produced as an incident to the operation of my blanking press, consists only of short sections, the relative extent of which is indicated by the characters $b^x$ and $b^y$, in Fig. 2. To clear this scrap from the machine, I have provided a series of deflecting and guiding aprons, $c$, $c^1$, $c^2$, the aprons $c$ being conveniently arranged in proximity to the cutters to deflect the scrap from the machine. The aprons $c^1$ will guide the scrap through openings in the floor and the aprons $c^2$ will guide the scrap to a moving conveyer, by which it may be delivered to a distant place for storage or to car for shipment. If any of the scrap thus produced is of usable size, it may be conducted to storage or directly to another machine, without intermediate handling.

Thus, by my invention, the blanking press is cleared from scrap, and the latter stored without the delay in the operation of the press or the employment of the manual labor heretofore necessary.

When discharged from the machine the blanks $c^x$ will be automatically delivered to other machines designed to shape them into side bars for the frame of motor vehicles, subject them to the necessary milling operations, attach parts, and assemble them in completed frames.

The presses in the machine will be so connected and driven that they will be operated substantially in unison, during the step by step feeding movement of the metal plates from press to press. It is apparent also that the presses may be contained in a single frame, instead of two as shown in the drawings. Where the limitations of space will permit, and the size of the blank does not approach the capacity of the press, the second set of sectional dies may be placed upon the first press, to complete at the second operation of the press the punching operation inaugurated by the first set of sectional dies, upon the preceding operation. It may in some classes of work be advantageous to mount more than two sets of dies upon the bed and platen of one press. In other classes of work, it is expedient to perform more than two punching operations to complete the contour of the blank, and by "subsequent" operation, as recited in some of the claims, I contemplate one or a plurality of operations succeeding the first. A suitable arrangement of chutes or conveyers for the scrap will be provided in all such cases. All of these arrangements are within the scope of my invention.

As hereinbefore stated, the use of short sectional dies has been found to be of great advantage in that sectional dies of standard outlines can be used in much of the work, and such dies are easily adjusted to the positions required in setting up the presses for different classes of work. Moreover, the loss caused by breakage, as in the case of dies of any considerable length is obviated, and the loss due to warping while hardening such dies is eliminated. As indicated at $b^x$, in Fig. 2, and in other figures on the drawings, the dies employed for making the first series of alternate cuts from the plate, are flared so that the scrap will pass freely therefrom.

The machine hereinbefore described and illustrated in the accompanying drawings may be modified, without departing from the spirit of my invention.

Having thus described my invention, what I desire to secure by Letters Patent is:—

1. In a machine for producing contoured blanks from sheet metal plates, a plurality of successively operating means for removing the marginal portions of the plate beyond the outlines of the blank in separated sections.

2. In a machine for producing contoured blanks from metal plates, the combination of means for removing sections of the marginal portion of the plate beyond the outlines of the blank at one operation, with means for subsequently removing the remaining marginal portions of the plate.

3. In a machine for producing blanks from metal plates, the combination of means for removing a part of the marginal portions of the plate beyond the outlines of the blank at one operation, means for subsequently removing the remaining marginal portions of the plate, and devices for feeding the plates to the said means.

4. In a blank cutting machine, the combination of dies to remove sectional portions of the margin of the plate in one operation, with dies to remove the remaining portions by subsequent operation, and actuating mechanism for the dies, as described.

5. In a machine for producing blanks from metal plates, the combination of means for cutting away sectional portions of the margin of the plate in one operation, with means for cutting away other portions of the plate in a subsequent operation and means for step-by-step feeding the plates to the cutting means.

6. In a machine for producing blanks from metal plates, the combination of means for cutting away sectional portions of the margin of the plate in one operation, with means for cutting away the remaining portions by a second operation, and means for step-by-step feeding the plates to the cutting means.

7. In a machine for producing contoured flat blanks from metal plates, the combination of devices for partially contouring the blank along one line in one operation, with devices for completely contouring the blank along the same line in a subsequent operation.

8. In a machine for producing contoured flat blanks from metal plates, the combination of devices for partially shaping the blank in one operation, and devices for completely shaping the blank at a subsequent operation, with means for step-by-step feeding the plate to the shaping devices.

9. In a machine for producing blanks from metal plates, the combination of a plurality of successively acting dies to remove sectional portions of the margin of the plate, means for actuating the dies in succession and devices for feeding the plates to the dies between successive operations.

10. In a machine for producing flat blanks from metal plates, the combination of devices for cutting away portions of the margin of the plate in one operation, together with devices for cutting away the remaining marginal portions in a second operation, to complete the contour of the blank.

11. In a machine for producing flat blanks from metal plates, the combination of devices for cutting away units of the margin of the plate in commercial scrap sizes, together with devices for subsequently removing the remaining marginal units, to complete the contour of the blank.

12. In a machine for producing contoured blanks from metal plates, the combination of an independently acting set of punches and dies adapted to remove alternate marginal sections of the plate, other like independently acting punches and dies adapted to remove marginal portions of the plate to complete the contour of the blank; and means for positioning the plate for successive action by the said sets of punches and dies.

13. In a machine for producing blanks from metal plates, a set of shearing dies for cutting away alternate units of the margin of the plate, a second set of shearing dies for cutting away other units, and devices for feeding the plates from the first set of dies to the second, in the intervals between shearing operations.

14. In a machine for producing contoured blanks from sheet metal plates, the combination of a die carrying member, and actuating means therefor, with dies for cutting the sheet metal on the outline of the blank and also for dividing the margin of the sheet beyond the outline of the blank at points spaced apart throughout its length, so that such margin is reduced to scrap in the blanking operation.

15. In a machine for producing blanks from sheet metal plates, a series of dies provided with cutting edges for effecting contour of the blank, and other cutting edges for dividing the marginal portion of the plate, to convert such marginal portion into scrap, and means for actuating the dies.

16. In a machine for producing blanks from sheet metal plates, the combination of a series of dies provided with cutting edges for effecting contour of the blank, and other cutting edges for dividing the marginal portion of the plate to convert such marginal portion into scrap, means for actuating the dies, and means for directing the scrap from the press.

17. A sheet metal blanking press provided with dies having cutting edges for imparting a partial contour to the blank and other cutting edges for dividing the marginal portions of the plate to convert the latter into scrap, and other dies having cutting edges for completing the contour of the blank, combined with means for actuating the dies.

18. A sheet metal blanking press provided with dies having cutting edges for imparting contour to the blank and other cutting edges for dividing the marginal portions of the plate to convert the latter into scrap, combined with means for actuating the dies, and means for deflecting the scrap from the press.

19. In a machine for producing contoured flat blanks from metal plates, the combination of means for partially contouring the blank in one operation, other subsequently operating means for completely contouring the blank, step-by-step feeding devices for the plates, and devices for positioning the plates with reference to the contouring means.

20. In a machine for producing contoured blanks from metal plates, the combination of means for cutting away portions of the margin of the plate at one operation, means for cutting away the other marginal portions at a second operation, devices for feeding the plates from the first cutting means to the second, and devices for positioning the plates with reference to the cutting means.

21. In a machine for producing contoured flat blanks from metal plates, the combination of a series of dies for partially shaping the blank in one operation, a second series of dies for completely shaping the blank in another operation, feeding devices for the plates, and blank positioning devices actuated by the feeding devices.

22. In a machine for producing contoured metal blanks, the combination of a plurality of independently acting dies, each of which is adapted to cut away a marginal portion of the plate from which the blank is formed, with means for actuating the dies.

23. In a machine for producing contoured metal blanks, the combination of a plurality of independently acting sets of dies, each set adapted to cut away marginal portions of the plate from which the blank is formed, with means for actuating the dies, and devices for feeding the plates to the dies.

24. A blanking press having a plurality of sets of dies, each set adapted to cut away marginal portions of the plate, devices to feed the plates from one set of dies to the other, retracting means for the feeding devices, and devices for positioning the plate for the action of the dies.

25. In a blanking press, the combination of a plurality of independently acting sets of dies, each set adapted to cut away marginal portions of the plate from which the blank is formed, devices to feed the plate from one set of dies to the other, with means for so moving the feeding devices, and for retracting the said devices upon completion of the feeding movement.

26. A blanking press having a plurality of sets of dies adapted by successive operations to complete the contour of a blank, devices having a movement in the plane of the dies to feed the plates from one set of dies to the other and a retracting movement out of the plane of the dies, means for operating the feeding devices as described, and means for positioning the plate for the action of the dies.

27. In a machine for producing contoured metal blanks, the combination of a plurality of sets of spaced dies, each die in each set adapted to remove a portion of the margin of the blank in a contouring operation, feeding means for delivering material to the first set of dies and from one set of dies to the next, and actuating devices operative in a timed cycle of feeding, die cutting and retracting operations, whereby the contouring operations may be made continuous and successive completed blanks delivered at definite intervals.

28. The process of forming blanks from sheet metal plates which consists in cutting the plate at separated points on the contour line of the blank in one operation, and cutting the plate on the line intermediate the said points in a subsequent operation.

29. The process of shaping sheet metal blanks of irregular form, which consists in removing the marginal portions of the metal plate by simultaneously cutting away alternate sections of such marginal portions in one operation, and then simultaneously cutting away other marginal portions in a second operation.

30. The process of forming blanks from sheet metal plates, which consists in removing the margin of the plate exterior to the outline of the blank, by a punching operation divided into a succession of steps, one of which removes alternate sections of the margin, and the other of which removes the remaining sections.

31. The process of converting sheet metal plates of regular outline into blanks of irregular outline, which consists in subjecting the metal plate to a punching operation whereby alternate marginal portions are removed from the plate, and to a subsequent punching operation whereby the remaining marginal portions are removed, to complete the contour of the blank.

32. The process of converting sheet metal plates into blanks and the skeleton of the plate into scrap, which consists in cutting the plate on the contour lines of the blank and simultaneously cross cutting the skeleton of the plate at points spaced apart over its length.

33. The process of converting sheet metal plates into blanks and the skeleton of the plate into scrap, which consists in cutting the plate on the contour lines of the blank, and simultaneously cutting the skeleton portion of the plate substantially at right angles to said contour lines.

In testimony whereof I have signed my name at Milwaukee, Wisconsin, this 14th day of February, 1919.

R. STANLEY SMITH.

Witnesses:
W. F. WOOLARD,
C. THEO. OSTERBERG.